(12) United States Patent
Kagami et al.

(10) Patent No.: US 9,417,447 B2
(45) Date of Patent: Aug. 16, 2016

(54) ROD LENS ARRAY AND IMAGE SENSOR

(71) Applicants: Yuichi Kagami, Yamanashi-ken (JP);
Kouji Ogino, Yamanashi-ken (JP)

(72) Inventors: Yuichi Kagami, Yamanashi-ken (JP);
Kouji Ogino, Yamanashi-ken (JP)

(73) Assignee: NISCA CORPORATION,
Minamikoma-Gun, Yamanashi-Ken (JP)

( * ) Notice: Subject to any disclaimer, the term of this patent is extended or adjusted under 35 U.S.C. 154(b) by 0 days.

(21) Appl. No.: 14/946,214

(22) Filed: Nov. 19, 2015

(65) Prior Publication Data
US 2016/0077334 A1 Mar. 17, 2016

Related U.S. Application Data

(63) Continuation of application No. 14/337,869, filed on Jul. 22, 2014, now Pat. No. 9,232,102.

(30) Foreign Application Priority Data

Jul. 23, 2013 (JP) ................................. 2013-153063

(51) Int. Cl.
| | | |
|---|---|---|
| *H01L 27/00* | (2006.01) | |
| *G02B 27/00* | (2006.01) | |
| *H04N 1/00* | (2006.01) | |
| *G02B 3/00* | (2006.01) | |
| *G02B 13/00* | (2006.01) | |
| *G02B 27/12* | (2006.01) | |

(52) U.S. Cl.
CPC .......... *G02B 27/0075* (2013.01); *G02B 3/0087* (2013.01); *G02B 13/0095* (2013.01); *G02B 27/123* (2013.01); *H04N 1/00557* (2013.01); *H04N 1/00909* (2013.01)

(58) Field of Classification Search
CPC ............ H04N 1/00559; H04N 1/1048; H04N 1/1935; H04N 1/19589
USPC ............... 250/208.1, 216, 234, 235; 359/621, 359/622; 358/474; 347/241, 242, 244, 245
See application file for complete search history.

(56) References Cited

U.S. PATENT DOCUMENTS

| | | | |
|---|---|---|---|
| 2007/0014022 A1* | 1/2007 | Wu ...................... | G02B 3/0031 359/621 |
| 2015/0028191 A1* | 1/2015 | Kagami ............. | H04N 1/00909 250/208.1 |

FOREIGN PATENT DOCUMENTS

JP     2014-235348 A     12/2014

* cited by examiner

*Primary Examiner* — Kevin Pyo
(74) *Attorney, Agent, or Firm* — Manabu Kanesaka

(57) ABSTRACT

A rod lens array includes a plurality of columnar rod lenses each having a refractive index distribution in which a refractive index continuously decreases from a central axis thereof to an outer periphery, and arranged in at least one row to align the central axes in parallel to each other. Each of the plurality of columnar rod lenses includes an emission-side end portion region, an incident-side end portion region, and an intermediate region between the emission-side end portion region and the incident-side end portion region, each having a central refractive index. The central refractive index of the incident-side end portion is equal to that of the emission-side end portion region in an optical axis direction, and the central refractive index at the intermediate region is higher than those of the emission-side and incident-side end portion regions.

2 Claims, 9 Drawing Sheets

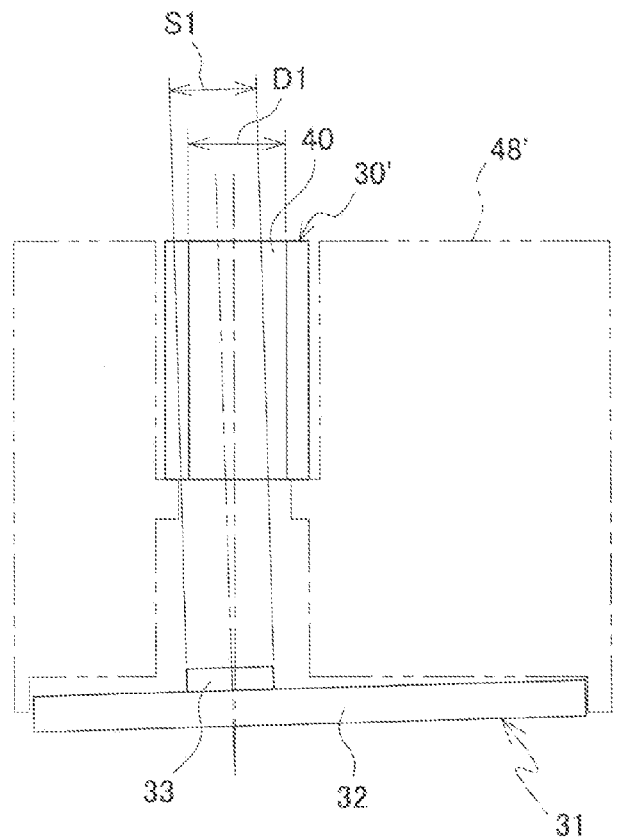
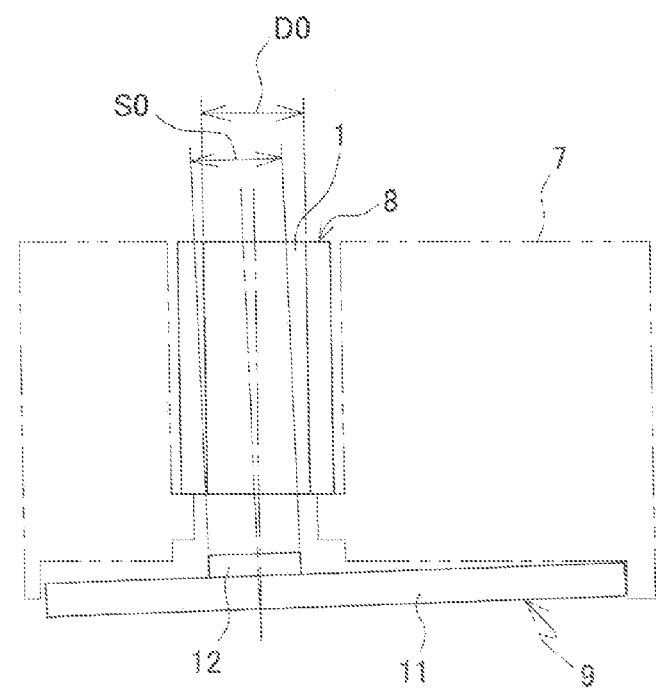

ROD LENS ARRAY AND IMAGE SENSOR

CROSS-REFERENCE TO RELATED APPLICATION

This is a continuation application of U.S. patent application Ser. No. 14/337,869 filed on Jul. 22, 2014, which claims a priority of Japanese Patent Application No. 2013-153063 filed on Jul. 23, 2013.

BACKGROUND OF THE INVENTION

1. Technical Field

The present invention relates to a rod lens array used for an image sensor in image reading devices, such as image scanners, or other various optical devices, and to an image sensor that includes the rod lens array.

2. Description of Related Art

In conventional image reading devices, such as facsimile machines, copiers, image scanners, or printers, and other various optical devices, a contact-type image sensor (CIS) of an equal-magnification image-forming optical system is widely used to optically read an image on a document and convert the image into electric signals. The CIS includes a rod lens array in which one or more rows of many cylindrical rod lenses are arranged between two substrates in such a way that the central axes of the lenses become parallel to each other (For example, see Jpn. Pat. Appln. Laid-Open Publication No. 2012-244344).

The rod lens is so designed as to have a refractive index distribution in which the refractive index decreases continuously from the central axis thereof to an outer periphery. Most of the rod lens were originally glass lenses, which were produced by carrying out a spinning molding of a rod-shaped glass material and giving the refractive index distribution through ion-exchange treatment or cation heat interchange (For example, see Jpn. Pat. Appln. Laid-Open Publication No. 10-139472).

Relatively low-cost plastic rod lenses whose refractive index distributions can be precisely controlled are now frequently employed (For example, see Jpn. Pat. Appln. Laid-Open Publication No. 2012-78750).

The CIS could have an adverse effect on the reading of images or outputting of sensors if dust gets into the CIS from the outside or if processing debris comes off from components inside the CIS. In particular, in order to prevent dust from getting into a space between a transparent member or platen glass, on which a document is placed, and a rod lens array, what is known is the CIS in which the rod lens array is put between the platen glass and a support member without any gap therebetween to eliminate the space which dust can get into (For example, see Jpn. Pat. Appln. Laid-Open Publication No. 05-344276).

When the CIS is assembled, the rod lens array needs to be placed at a predetermined position with high precision to get optimal optical performance. To eliminate the need for precise positioning or fine tuning of the rod lens array and to make it easier to put the rod lens array into the CIS, what is proposed is a micro lens array structure in which, to one lens end surface of the rod lens array, a reed-shaped transparent light guide member having an optical length equal to an operating distance of the rod lens is attached, and a light receiving element array is integrally joined to the other surface of the transparent light guide member (For example, see Jpn. Pat. Appln. Laid-Open Publication No. 05-134104).

Basically, there is a strong call for the above optical devices to be miniaturized. Similarly, there is a call for the contact-type image sensor to be made smaller in size by reducing the distance between an object, such as a document, and an image, or the image-forming distance. On the other hand, in the contact-type image sensor, in order to enable the sensor to read a clear image even if the distance between the surface of the document and the rod lens is somewhat changed due to floating of the document or the like, the depth of focus of the rod lens needs to be set as deeper as possible.

FIG. 9 schematically shows how an image is formed by a conventional rod lens of an upright equal-magnification image-forming system. In the diagram, the rod lens 1 is a cylindrical lens with a constant radius of $r_0$ and a lens length of $Z_0$; at the incident and emission ends thereof, there are an incident surface 2 and emission surface 3 that are polished to be flat. The refractive index of the rod lens 1 continuously decreases from a refractive index N1 at a central axis thereof in a radial direction. The light coming from a point image P0 on a document surface 4 enters the incident surface 2 of the rod lens 1, and meanders through the rod lens at a constant frequency in an optical axis direction. Then, the light comes out through the emission surface 3, and a point image I0 is formed on a light receiving surface 5 of a light receiving element. In this case, the distance between the point image P0 and the incident surface 2, or the operating distance L0, is equal to the distance between the point image I0 and the emission surface 3.

The depth of focus of the rod lens 1 is inversely proportional to a numerical aperture, and the numerical aperture is proportional to the refractive index N1 of the center, the refractive index distribution constant, and the radius r0 of the lens. Accordingly, if the refractive index N1 of the center and the refractive index distribution constant remain constant, the radius $r_0$ of the lens needs to be smaller to make the depth of focus deeper. However, if the radius $r_0$ of the lens is made smaller, the handling and processing of the rod lens becomes difficult when the rod lens is produced. Moreover, the brightness of the rod lens 1 sharply decreases in proportion to the square of the numerical aperture. As a result, there might be a decrease in the image reading performance.

Moreover, the operating distance L0 of the rod lens 1 changes in a tangent manner with respect to the lens length $Z_0$, and is inversely proportional to the refractive index N1 of the center and the square of the refractive index distribution constant. Therefore, if the refractive index N1 of the center and the lens radius $r_0$ are kept constant, and the refractive index distribution constant is made smaller, the operating distance L0 becomes longer when the lens length $Z_0$ is constant. As a result, the conjugation length of the rod lens 1 (the distance between the object and the image $=Z_0+2L0$) becomes longer, and the entire optical system becomes longer. Therefore, the rod lens array and the image sensor that includes the rod lens array cannot be made smaller in size. If the lens length $Z_0$ is made smaller to prevent the operating distance L0 from becoming longer, the field of view of the rod lens 1 and the radius thereof become smaller, possibly leading to a periodic light intensity variation. Therefore, such a configuration is not preferred.

SUMMARY OF THE INVENTION

The present invention has been made in view of the above problems of the prior art. The object of the present invention is to provide a rod lens array and an image sensor including the rod lens array in which a depth of focus can be set deep and an entire optical system can become shorter without the image reading performance being reduced.

Another object of the present invention is to provide a contact-type image sensor including the rod lens array to reduce the size of the contact-type image sensor.

According to the first aspect of the present invention, a rod lens array comprises a plurality of columnar rod lenses each having a refractive index distribution in which a refractive index continuously decreases from a central axis thereof to an outer periphery, and arranged in at least one row to align the central axes in parallel to each other. Each of the plurality of columnar rod lenses includes an emission-side end portion region, an incident-side end portion region, and an intermediate region between the emission-side end portion region and the incident-side end portion region, each having a central refractive index. The central refractive index of the incident-side end portion is equal to that of the emission-side end portion region in an optical axis direction; and the central refractive index at the intermediate region is higher than those of the emission-side and incident-side end portion regions.

According to the second aspect of the present invention, an image sensor comprises the rod lens array according to the first aspect, and a light receiving sensor to receive light of an image formed through each of the plurality of columnar rod lenses of the rod lens

BRIEF DESCRIPTION OF DRAWINGS

FIGS. 6A and 6B are schematic diagrams illustrating how the rod lens array shown in FIG. 2 is mounted on an image sensor unit with a conventional structure;

DETAILED DESCRIPTION OF THE INVENTION

Hereinafter, a preferred embodiment of the present invention will be described in detail with reference to the accompanying drawings.

Figure 1:
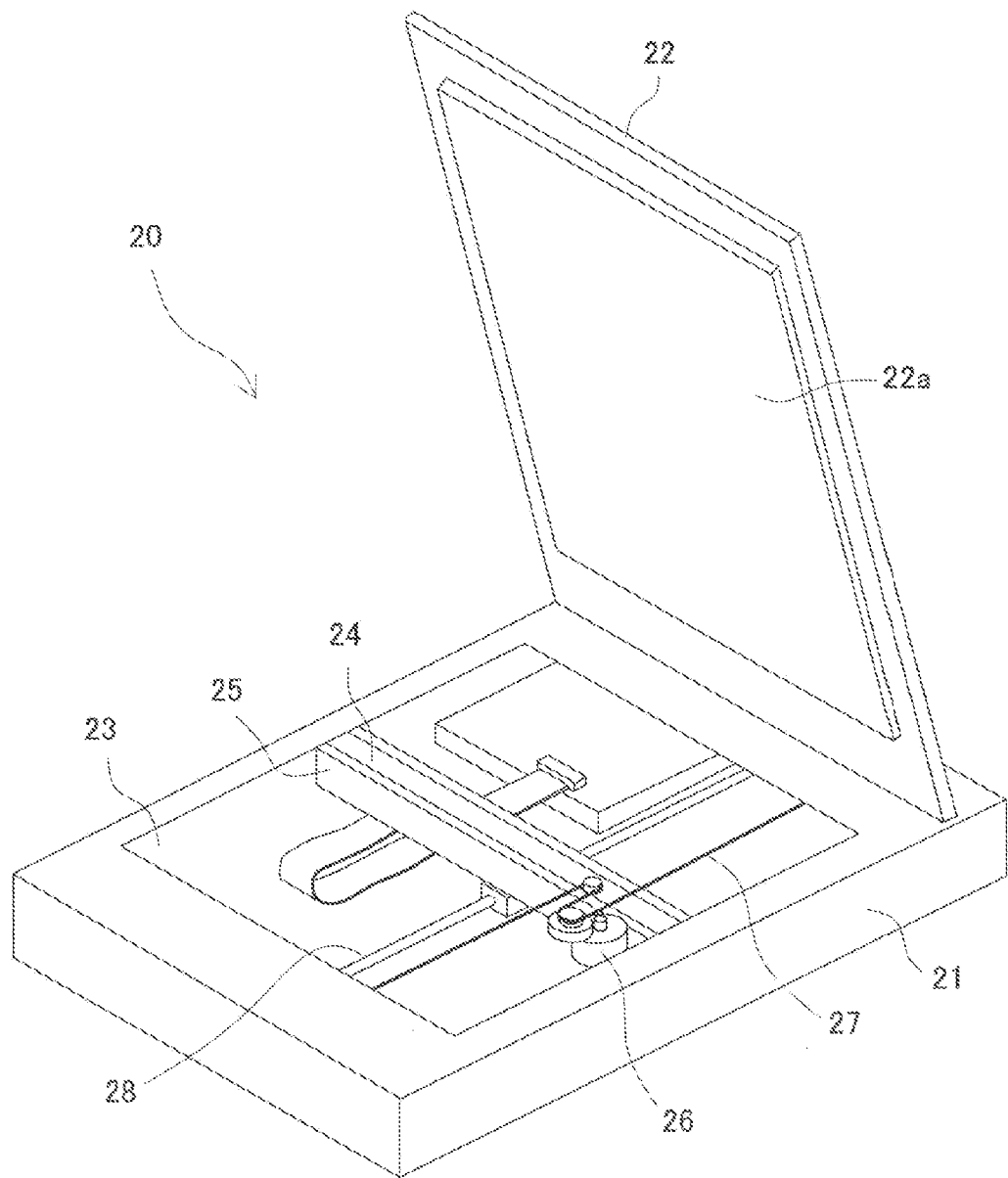
FIG. 1 is a schematic perspective view of an image scanner on which an image sensor unit of the present invention is mounted.

FIG. 1 is a schematic perspective view of an image scanner on which an image sensor unit of a preferred embodiment of the present invention is mounted. An image scanner 20 of the present embodiment is an image reading device of a flatbed type. The image scanner 20 includes a main body 21, which is substantially in the shape of a rectangular box, and a platen cover 22, one end of which is mounted on the main body through a hinge (not shown) in such a way that the platen cover 22 can be freely opened or closed.

The main body 21 includes a platen glass 23, which is a large rectangular transparent glass plate fixed on an upper surface thereof, and a contact-type image sensor unit 24 of the present invention. On an upper surface of the platen glass 23, a to-be-read document is placed with a document surface thereof down. When the platen cover 22 is closed, the document surface comes in close contact with the upper surface of the platen glass due to a pressing member 22a that is provided on an inner surface thereof.

The image sensor unit 24 is disposed immediately below the platen glass 23. The image sensor unit 24 is held by a holding member 25 in such a way that the upper surface thereof is in close contact with a lower surface of the platen glass. During reading of the document, the image sensor unit is driven by a drive motor 26 via a wire 27 and the like in such a way as to move in a document reading direction or a sub-scanning direction along a slide shaft 28.

Figure 2:
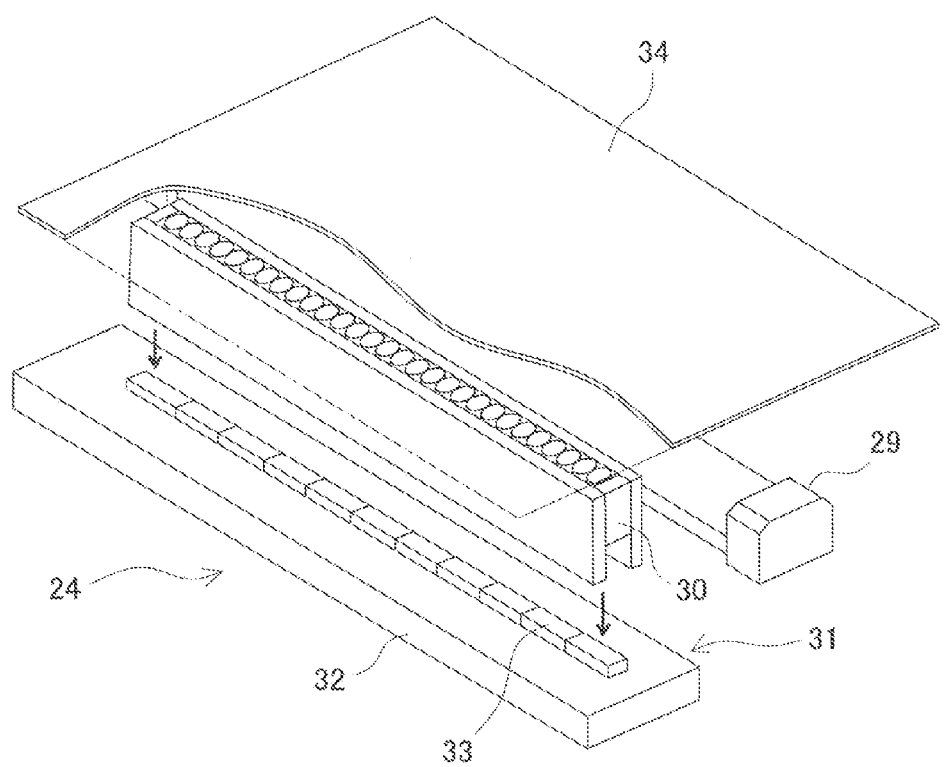
FIG. 2 is a schematic exploded perspective view of the image sensor unit of the present invention.

FIG. 2 schematically shows the basic configuration of the image sensor unit 24 of the present embodiment. The image sensor unit 24 includes a lighting device 29, a rod lens array 30, and a light receiving sensor 31. The image sensor unit 24 further includes a housing in which the lighting device, the rod lens array, and the light receiving sensor are mounted and held at predetermined positions.

The light receiving sensor 31 includes a large number of photoelectric conversion elements 33, which are mounted in a line on a sensor substrate 32. As the photoelectric conversion elements 33, for example, solid-state imaging elements, such as CMOS image sensors or CCD image sensors, are used. The rod lens array 30 is disposed in such a way that a lower-end emission surface thereof is aligned with the photoelectric conversion elements. The illumination light emitted from the lighting device 29 is reflected by a document surface of a document 34 before entering an upper-end incident surface of the rod lens array 30. Then, the light comes out through a lower-end emission surface, and an image is formed on the photoelectric conversion elements 33.

The lighting device 29 includes light-emitting elements such as LEDs as light sources, and a light guide rod, which guides the light emitted from the light-emitting elements. The light guide rod is made of a transparent material with a high level of translucency, such as glass, acrylic resin, or epoxy resin; the light guide rod has a length corresponding to a reading line width of the image sensor unit 24. The light guide rod includes an emission surface and a light scattering surface, which face each other across almost the entire length of a longitudinal direction thereof. The light that enters an end surface of the light guide rod from the light-emitting elements is guided in the longitudinal direction while being reflected by an inner surface of the light guide rod. Then, the light is reflected by the light scattering surface, and is emitted to the document 34 as an illumination light having a uniform amount of light in the longitudinal direction.

Figure 3:
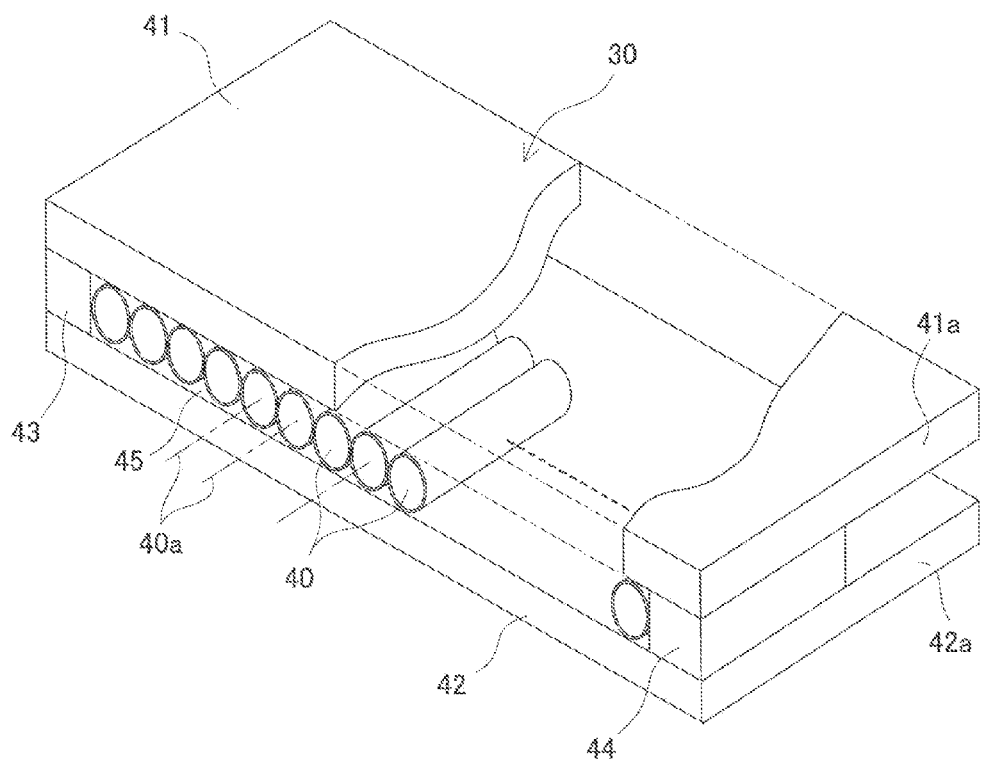
FIG. 3 is a schematic partially-broken perspective view of a rod lens array shown in FIG. 2.

FIG. 3 schematically shows the configuration of the rod lens array 30 for line-scanning, which is used in the image sensor unit 24. The rod lens array 30 includes one row of rod lenses: a large number of rod lenses 40 are arranged between two rectangular substrates 41 and 42 and between the spacers 43 and 44 in a main scanning direction of the image sensor unit 24 in such a way that the central axes of the rod lenses, or optical axes 40a, become parallel to each other. A gap between the rod lenses 40, the substrates 41 and 42, and the spacers 43 and 44 is filled with a thermosetting black silicon resin 45, for example. In this manner, the rod lenses are bonded and fixed.

The two substrates 41 and 42 have extension portions 41a and 42a, respectively, which extend a predetermined length toward the emission side thereof in the optical axis direction of the rod lenses 40. The predetermined length of the extension portions 41a and 42a may be set based on an operating distance of the rod lenses 40, for example.

According to the present embodiment, the extension portions 41a and 42a are equal in length in the optical axis direction of the rod lenses. Moreover, the extension portions 41*a* and 42*a* are so formed as to have a constant length in the longitudinal direction of the rod lens array. According to another embodiment, the optical-axis-direction lengths of the extension portions 41*a* and 42*a* may be different. Moreover, the optical-axis-direction length of each extension portion may not necessarily be constant in the longitudinal direction of the rod lens array.

According to the present embodiment, the adjacent rod lenses 40 are disposed in such a way as to be in close contact with each other, as shown in the diagram. According to another embodiment, a certain gap may be provided between the rod lenses 40 that are disposed. Moreover, two or more rows of rod lenses may be arranged.

The rod lenses 40 each are a cylindrical lens, which is uniformly circular in cross-section along the central axis or the optical axis with a radius of r1, and which has both end surfaces that are perpendicular to the optical axis and have been polished to be flat. Each rod lens 40 has a refractive index distribution in which the refractive index thereof decreases continuously from the central axis to an outer periphery. Furthermore, the rod lenses 40 of the present embodiment have the following refractive index distribution characteristics: the refractive index thereof continuously changes in the optical axis direction.

Moreover, the size and shape of the circular cross-section of the rod lenses 40 may be changed in an axis line direction. Furthermore, the cross-section of the rod lenses 40 may be formed into various shapes except for the circular shape, such as a polygon or cross, for example.

Figure 4:
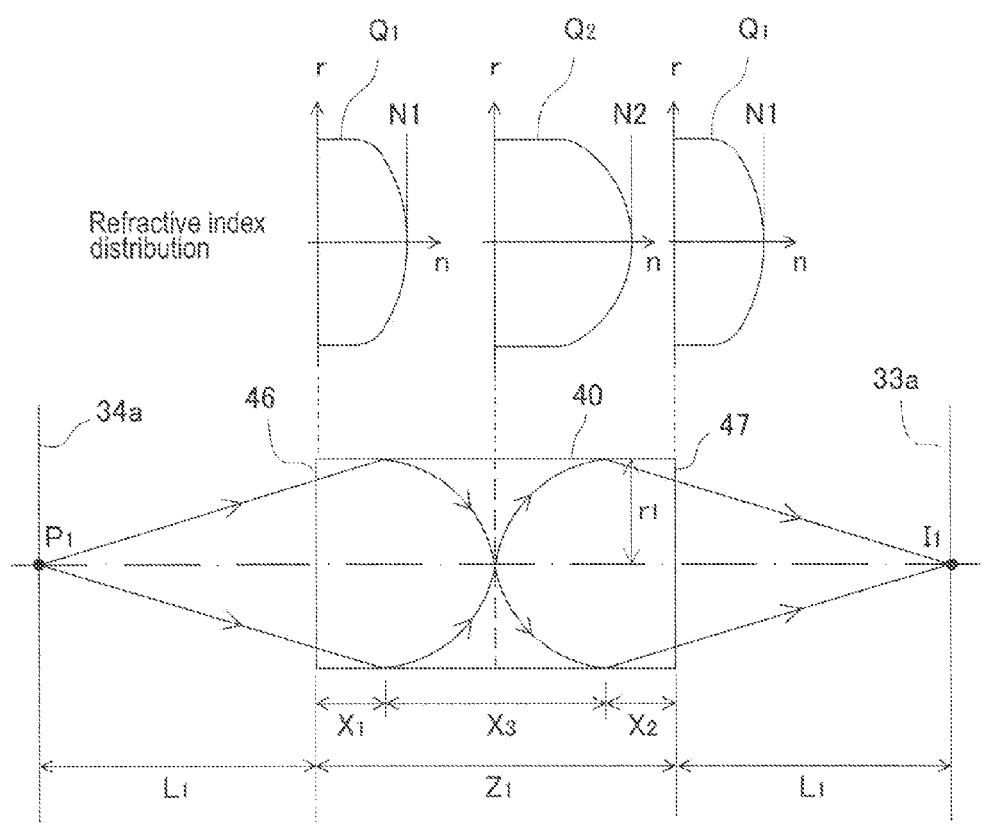
FIG. 4 is a diagram illustrating how an image is formed through a rod lens shown in FIG. 3.

As shown in FIG. 4, a rod lens 40 has a refractive index distribution Q1 in which, in the optical axis direction, an incident-side end portion region X1 and an emission-side end portion region X2 have the same refractive index N1, i.e., the refractive indices of the central axes of those regions, or the central refractive indices of those regions, are equal. However, in an intermediate region X3 between the above regions, the central refractive index N2 is greater than N1; the intermediate region X3 is so designed as to have a refractive index distribution Q2 that is different from those of the incident-side and emission-side end portion regions X1 and X2. Accordingly, the light that is reflected off a point image P1 on the document surface 34*a* enters an incident surface 46 of the rod lens 40, and meanders through the incident-side end portion region X1 in accordance with the refractive index distribution Q1. After entering the intermediate region X3, the light meanders through the region in accordance with the refractive index distribution Q2. Furthermore, the light meanders through the emission-side end portion region X2 in accordance with the first refractive index distribution Q1, before being emitted through an emission surface 47. As a result, a point image I1 is formed on light-receiving surfaces 33*a* of the photoelectric conversion elements 33.

The optical-axis-direction refractive index distribution can be set in such a way that the refractive index gradually changes between the incident-side and emission-side end portion regions X1 and X2 and the intermediate region X3. According to another embodiment, the refractive index can be set in such a way as to rapidly change between the incident-side and emission-side end portion regions X1 and X2 and the intermediate region X3. Moreover, the refractive index may be set in such a way as to continuously change in the optical axis direction in the intermediate region X3. In this case, the peak central refractive index N2 may not necessarily come at an optical-axis-direction central position of the rod lens 40.

As described above, since the optical-axis-direction refractive index distribution is given, the frequencies of the light that meanders through the incident-side and emission-side end portion regions X1 and X2 in the optical axis direction are equal. The frequency of the light that meanders through the intermediate region X3 in the optical axis direction is shorter than the frequencies for the incident-side and emission-side end portion regions X1 and X2. In this case, the distance between the point image P1 and the incident surface 46, or the operating distance L1, is equal to the distance between the point image I1 and the emission surface 47.

Figure 9:
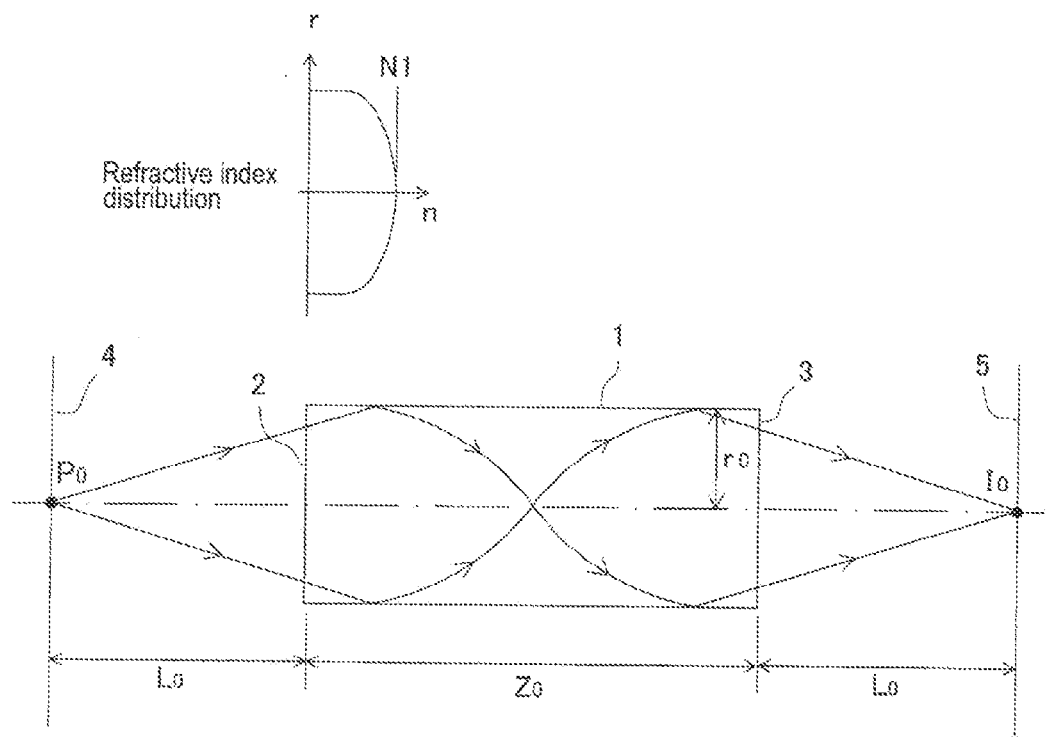
FIG. 9 is a diagram illustrating how an image is formed through a conventional rod lens.

This is compared with the conventional rod lens 1 shown in FIG. 9. Both rod lenses 1 and 40 have the same lens radius r0 or r1, and have the same depth of focus. Therefore, assume that the operating distances L0 and L1 are equal. In the rod lens 40 of the present embodiment, the length of the intermediate region X3 is shorter than a corresponding intermediate region of the conventional rod lens 1. Accordingly, the lens length Z1 is shorter than the lens length Z0 of the conventional rod lens 1. As a result, while keeping the same depth of focus, the conjugation length of the rod lens 40 ($=Z_1+2L1$) is shorter than that of the conventional rod lens 1. Therefore, the rod lens array 30 and the image sensor 24 can be made smaller in size. Moreover, since the lens radiuses are equal, the image reading performance does not drop.

The rod lenses 40 can be made by conventional techniques. For example, if a germanium-doped silica glass material is used for the production, it is known that different optical-axis-direction refractive index distributions can be given by changing the intensity of an emitted ultraviolet light in the optical axis direction to offer the refractive index distributions. Moreover, in the case of a plastics material, it is known that the refractive index can be changed in the optical axis direction by adjusting a light condensing region of a laser beam emitted to the polymer material.

Figure 5:
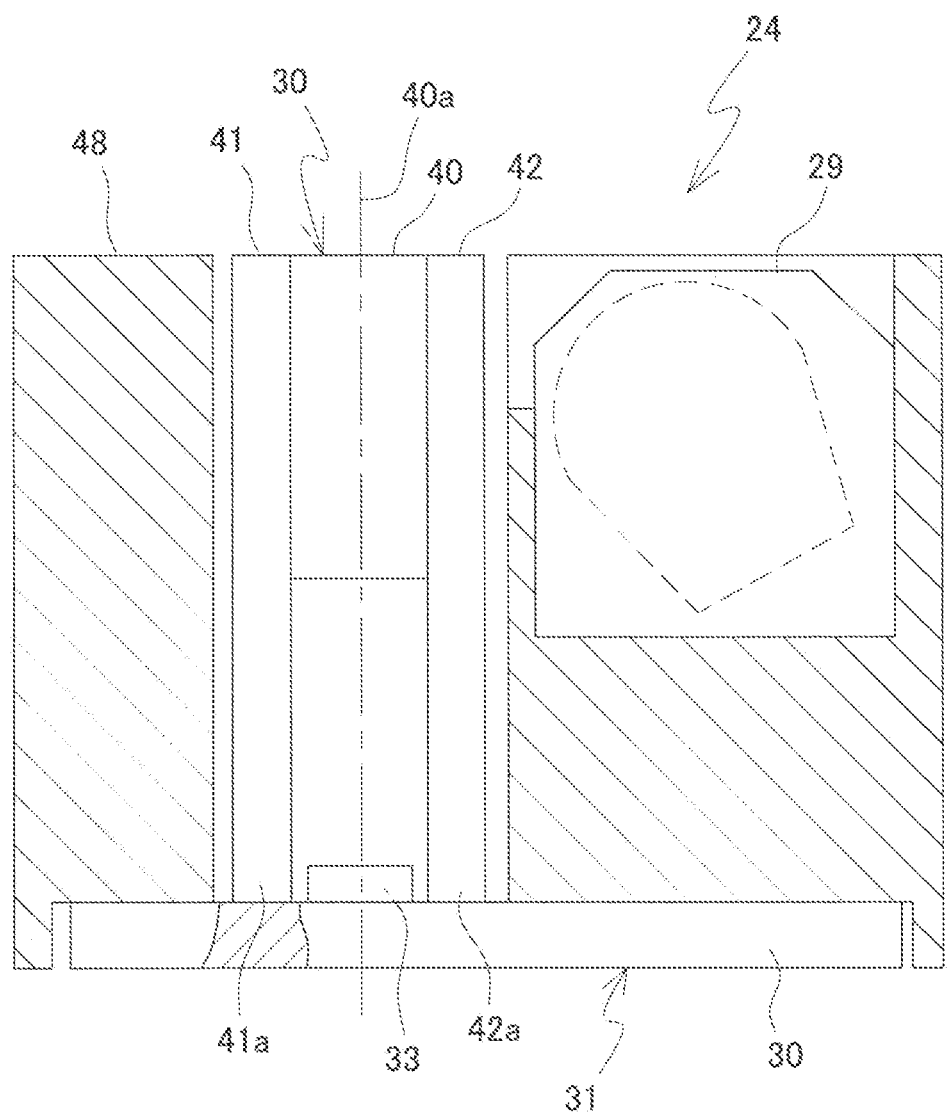
FIG. 5 is a schematic cross-sectional view of an image sensor unit according to the present embodiment.

FIG. 5 is a cross-sectional view of the image sensor unit according to the present embodiment. As shown in the diagram, the light receiving sensor 31 is fixed to a predetermined position through an appropriate fixing means, such as screws, fasteners, or adhesives, for example, at a lower end of a housing 48 of the image sensor unit 24 in such a way that the photoelectric conversion elements 33 face an inner side or an upper side in the diagram.

The rod lens array 30 is disposed above the light receiving sensor 31 in such a way that the extension portions 41*a* and 42*a* of the substrates 41 and 42 face a lower side, and that the photoelectric conversion elements 33 are positioned between the extension portions. The position of the rod lens array 30 is determined in such a way that both lower ends of the extension portions 41*a* and 42*a* come in contact with an upper surface of the sensor substrate 32, and that the optical axes 40*a* of the rod lenses 40 pass through the centers of the photoelectric conversion elements 33. In this manner, the rod lens array 30 is fixed to the housing 48. The rod lens array 30 may be directly fixed to the sensor substrate 32 at the lower ends of the extension portions 41*a* and 42*a*, and may be formed integrally with the light receiving sensor 31.

In that manner, a narrow space is established as being closed by the extension portions 41*a* and 42*a* of the substrates 41 and 42 in the horizontal direction in the diagram, in such a way that the photoelectric conversion elements 33 are enclosed between the emission surface of the rod lens array 30 and the sensor substrate 32. Therefore, even if the operating distance of the rod lenses 40 becomes longer, it is possible to prevent, in an effective manner, dust from getting into the optical path between the rod lenses 40 and the photoelectric conversion elements 33, or from adhering to the emission surfaces of the rod lenses 40 or the light receiving surfaces of the photoelectric conversion elements 33.

Furthermore, the rod lens array 30 can be positioned accurately and easily at a desired height and planar position with respect to the sensor substrate 32. FIG. 6A shows a comparative example: a rod lens array 30' having a conventional structure, in which rod lenses 40 of FIG. 4 with a long operating distance are sandwiched between two substrates that are equal in length to the rod lenses 40, is mounted on a housing 48' in the same way as the conventional structure of FIG. 9. In this case, if the sensor substrate 32 of the light receiving sensor 31 is mounted on the housing 48' in such a way as to be slightly inclined in the vertical direction, displacement occurs in terms of position and inclination between the incident ranges D1 of the rod lenses 40 and the light-receiving ranges S1 of the photoelectric conversion elements 33.

FIG. 6B shows the case where, in the image sensor unit 6 of FIG. 10 in which the conventional rod lens array 8 with a short operating distance is mounted on the housing 7, the sensor substrate 11 of the light receiving sensor 9 is similarly mounted on the housing in such a way as to be slightly inclined in the vertical direction at the same angle as that of FIG. 6A. Even in this case, displacement occurs in terms of position and inclination between the incident ranges D0 of the rod lenses 8 and the light-receiving ranges S0 of the photoelectric conversion elements 12. When FIG. 6A is compared with FIG. 6B, the same displacement occurs in terms of inclination. However, the positional displacement in FIG. 6A is far larger than that in FIG. 6B. The positional displacement between the incident ranges D1 of the rod lenses and the light-receiving ranges S1 of the photoelectric conversion elements 33 may lead to a significant drop in the quality of an output image.

According to the present embodiment, the lower ends of the extension portions 41a and 42a of the substrates of the rod lens array 40 come in contact with the upper surface of the sensor substrate 32. Therefore, even if the sensor substrate is mounted in such a way as to be inclined with respect to the housing 48, the above positional displacement does not occur between the incident ranges of the rod lenses 40 and the light-receiving ranges of the photoelectric conversion elements 33. Therefore, a stable, excellent output image can be obtained at any time.

Moreover, the substrates 41 and 42 of the rod lens array are appropriately rigid. Therefore, it is possible to prevent deformation of the sensor substrate 32.

Figure 7:
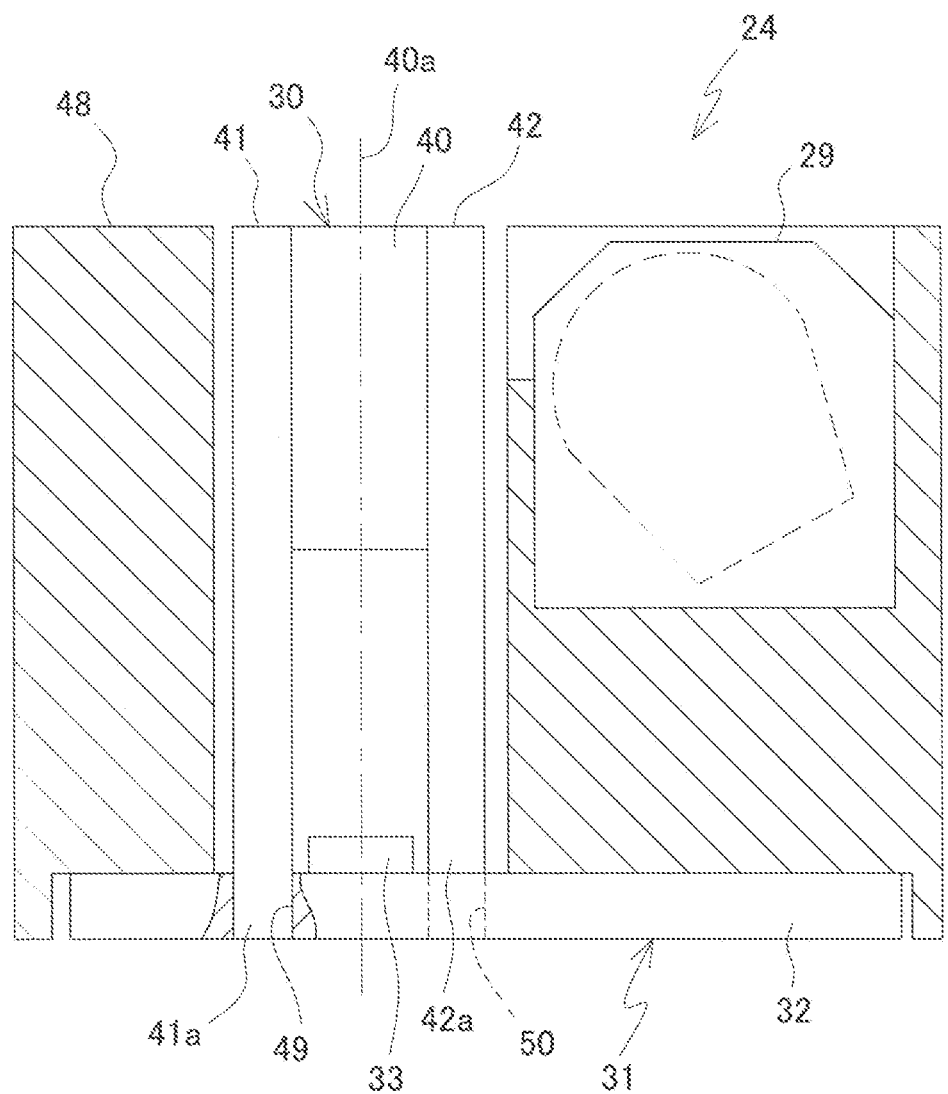
FIG. 7 is a schematic cross-sectional view of an image sensor unit according to a modified example of FIG. 5.

FIG. 7 shows an image sensor unit 24 according to a modified example of the present embodiment. As shown in the diagram, in this modified example, on the sensor substrate 32 of the light receiving sensor 31, through-holes 49 and 50 are provided at positions corresponding to the extension portions 41a and 42a of the substrates of the rod lens array 40. The through-holes 49 and 50 are formed into a single groove shape that fits the shape and size of the extension portions 41a and 42a.

The rod lens array 40 is fixed in a predetermined location as the extension portions 41a and 42a of the substrates 41 and 42 are fitted into the corresponding through-holes 49 and 50. In this manner, the rod lens array 40 and the light receiving sensor 31 are formed as one unit, and both can be positioned more reliably.

Figure 8:
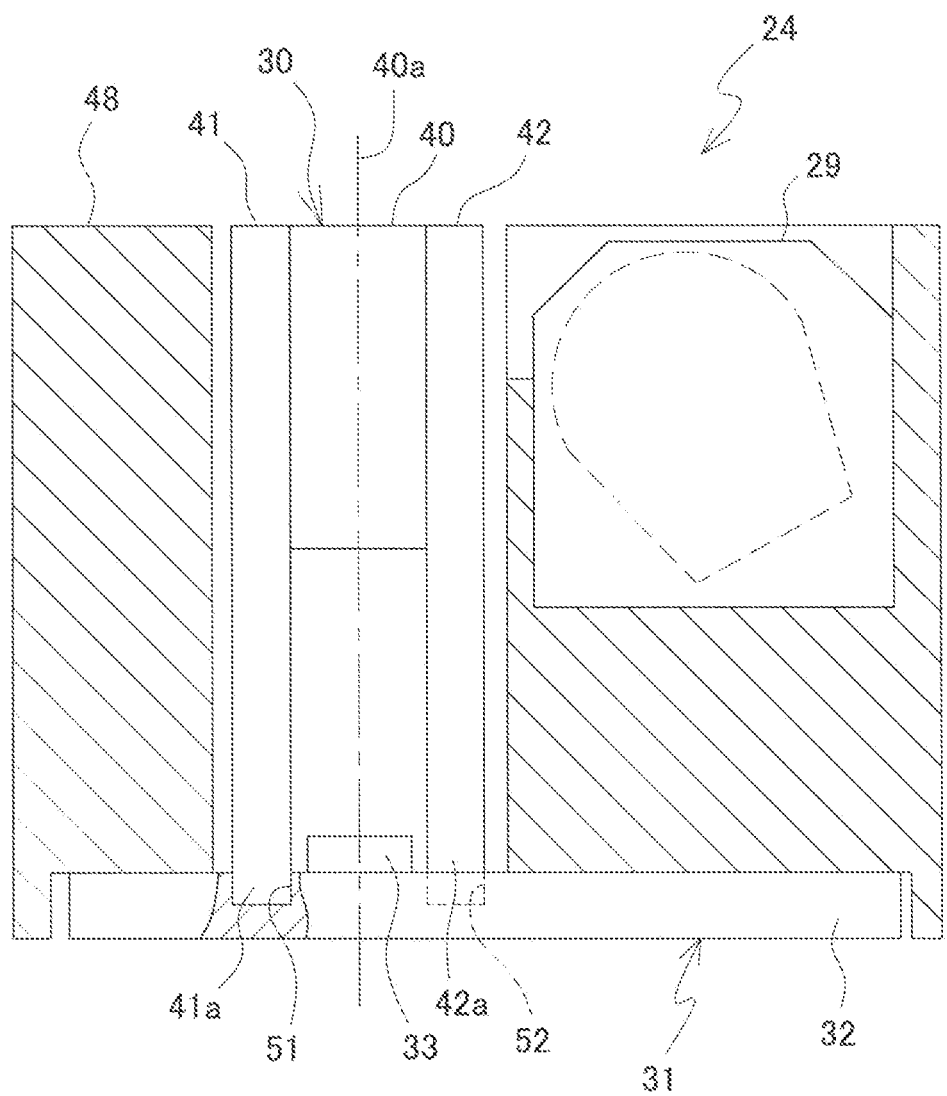
FIG. 8 is a schematic cross-sectional view of an image sensor unit according to a modified example of FIG. 7.

FIG. 8 shows an image sensor unit 24 according to a modified example of FIG. 7. As shown in the diagram, in this modified example, on the sensor substrate 32 of the light receiving sensor 31, instead of the through-holes, bottomed holes 51 and 52 are provided at positions corresponding to the extension portions 41a and 42a of the substrates of the rod lens array 40. The bottomed holes 51 and 52 are formed into a groove shape that fits the shape and size of the extension portions 41a and 42a.

The rod lens array 40 is fixed in a predetermined location as the extension portions 41a and 42a of the substrates 41 and 42 are fitted into the corresponding bottomed holes 51 and 52. In this manner, the rod lens array 40 and the light receiving sensor 31 are similarly formed as one unit, and both can be positioned more reliably.

In particular, in the examples shown in FIGS. 7 and 8, the extension portions 41a and 42a of the substrates 41 and 42 may not have a constant length across the longitudinal-direction entire length of the rod lens array 40. For example, on the sensor substrate 32, the through-holes or bottomed holes may be formed as a large number of grooves or holes, not in a single, continuous groove shape. In this case, only portions of the extension portions 41a and 42a of the substrates that correspond to the through-holes or bottomed holes may protrude in such a way as to become longer depending on the depth of each hole.

The present invention has been described in connection with preferred embodiments. However, the present invention is not limited to the above embodiments. Needless to say, various changes or modifications may be made for the embodiments within the technical scope thereof.

What is claimed is:
1. A rod lens array comprising:
a plurality of columnar rod lenses each having a refractive index distribution in which a refractive index continuously decreases from a central axis thereof to an outer periphery, and arranged in at least one row to align the central axes in parallel to each other, each of the plurality of columnar rod lenses including
an emission-side end portion region, an incident-side end portion region, and an intermediate region between the emission-side end portion region and the incident-side end portion region, each having a central refractive index,
wherein the central refractive index of the incident-side end portion is equal to that of the emission-side end portion region in an optical axis direction; and the central refractive index at the intermediate region is higher than those of the emission-side and incident-side end portion regions.
2. An image sensor, comprising:
the rod lens array according to claim 1, and
a light receiving sensor to receive light of an image formed through each of the plurality of columnar rod lenses of the rod lens array.

* * * * *